United States Patent
Wang et al.

(10) Patent No.: US 12,165,256 B2
(45) Date of Patent: Dec. 10, 2024

(54) COLOR MAP LAYER FOR ANNOTATION

(71) Applicant: Motional AD LLC, Boston, MA (US)

(72) Inventors: Xiaogang Wang, Singapore (SG); Venice Erin Baylon Liong, Singapore (SG); Zhiyong Weng, Boston, MA (US)

(73) Assignee: Motional AD LLC, Boston, MA (US)

( * ) Notice: Subject to any disclaimer, the term of this patent is extended or adjusted under 35 U.S.C. 154(b) by 52 days.

(21) Appl. No.: 17/991,794

(22) Filed: Nov. 21, 2022

(65) Prior Publication Data
US 2024/0127534 A1    Apr. 18, 2024

Related U.S. Application Data

(60) Provisional application No. 63/416,454, filed on Oct. 14, 2022.

(51) Int. Cl.
*G06T 17/05* (2011.01)
*G01C 21/00* (2006.01)
(Continued)

(52) U.S. Cl.
CPC .......... *G06T 17/05* (2013.01); *G01C 21/3815* (2020.08); *G01S 17/89* (2013.01);
(Continued)

(58) Field of Classification Search
CPC .................................. G06T 17/05; G06T 7/70
See application file for complete search history.

(56) References Cited

U.S. PATENT DOCUMENTS

| | | | | |
|---|---|---|---|---|
| 2013/0293702 | A1* | 11/2013 | Xin | H04N 9/73 348/135 |
| 2015/0081252 | A1* | 3/2015 | Loss | G06F 30/13 703/1 |
| 2017/0059306 | A1* | 3/2017 | Lasater | H04N 7/183 |
| 2019/0356897 | A1* | 11/2019 | Karivaradaswamy | H04N 13/139 |

(Continued)

FOREIGN PATENT DOCUMENTS

WO    WO 2020/154966    8/2020

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
Chen et al. "Progressive LiDAR Adaptation for Road Detection," IEEE/CAA Journal of Automatica Sinica, May 2019, 6:(3):693-702.
International Search Report and Written Opinion in International Appln. No. PCT/US2023/034179, maled on Feb. 7, 2024, 15 pages.

(Continued)

*Primary Examiner* — Yi Yang
(74) *Attorney, Agent, or Firm* — Fish & Richardson P.C.

(57) ABSTRACT

Some methods described include: receiving, with at least one processor, a point cloud from a pose graph; receiving, with the at least one processor, an image from a driving log of a vehicle, the image corresponding to the point cloud from the pose graph; obtaining, with the at least one processor, image pixel labels for the image; projecting, with the at least one processor, the point cloud in a point cloud coordinate system to an image coordinate system based on the image pixel labels; generating, with the at least one processor, a six-dimensional colored point cloud by combining the point cloud and color information from the image; and transforming, with the at least one processor, the six- (Continued)

dimensional colored point cloud into five-dimensional map tiles to form a colored map layer. Systems and computer program products are also provided.

18 Claims, 11 Drawing Sheets

(51) Int. Cl.
    *G01S 17/89*     (2020.01)
    *G06T 7/70*     (2017.01)
    *G06T 19/20*     (2011.01)
    *G06V 20/56*     (2022.01)
    *G06V 20/70*     (2022.01)

(52) U.S. Cl.
    CPC ............... *G06T 7/70* (2017.01); *G06T 19/20* (2013.01); *G06V 20/56* (2022.01); *G06V 20/70* (2022.01); *G06T 2207/10028* (2013.01); *G06T 2207/20072* (2013.01); *G06T 2207/30252* (2013.01); *G06T 2210/56* (2013.01); *G06T 2219/004* (2013.01); *G06T 2219/2012* (2013.01)

(56) References Cited

U.S. PATENT DOCUMENTS

| | | | | |
|---|---|---|---|---|
| 2020/0334841 A1* | 10/2020 | Cristobal | ................ | G06T 7/579 |
| 2021/0248390 A1* | 8/2021 | Liang | ................... | G06V 20/588 |
| 2022/0139094 A1* | 5/2022 | Yoshimi | ................ | G06V 10/26 |
| | | | | 382/173 |
| 2022/0291015 A1* | 9/2022 | Mori | ................... | G01C 21/3841 |
| 2022/0365186 A1* | 11/2022 | Schwiesow | ............... | G06T 7/97 |

OTHER PUBLICATIONS

Wang et al., "Lidar-Camera Fusion For Road Detection Using Recurrent Conditional Random Field Model," Research Square, Mar. 8, 2022, 12 pages.

\* cited by examiner

COLOR MAP LAYER FOR ANNOTATION

CROSS-REFERENCE TO RELATED APPLICATION

This application claims priority to U.S. Provisional Patent Application No. 63/416,454, filed Oct. 14, 2022, the entire contents of which is incorporated herein by reference.

BACKGROUND

Map annotations offer a way to highlight specific areas on the map and provide additional information about them. A color map layer can be used for map annotations. The existing color map layer is based on unaligned points in point clouds, and includes inaccurate point colors.

DETAILED DESCRIPTION

Figure 1:
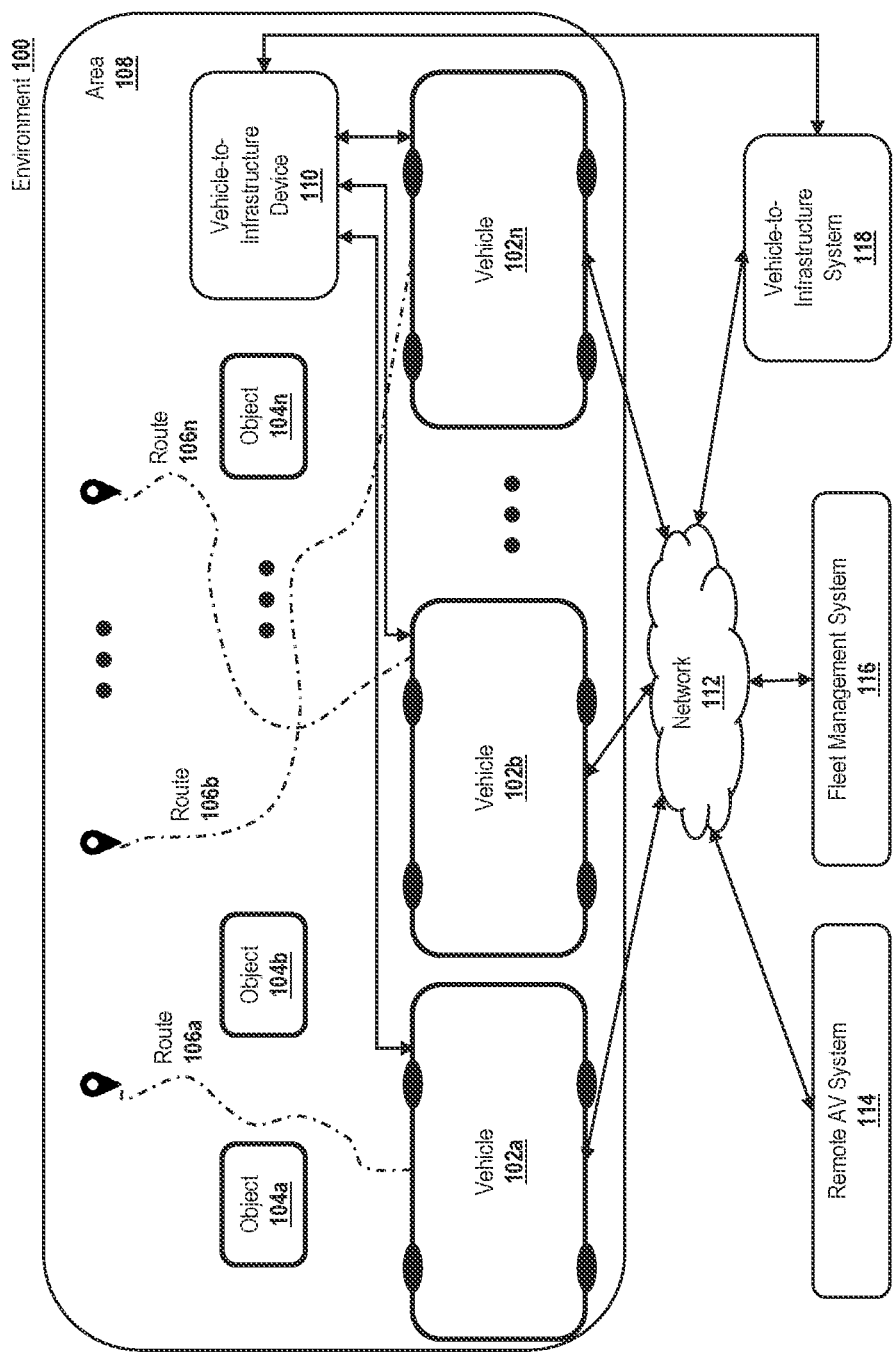
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like, are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships, or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit)

processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement generating a color map layer made of five-dimensional (5D) tiles (x, y, r, g, b). Six-dimensional (x, y, z, r, g, b) colored point clouds are transformed into 5D colored map tiles. In some embodiments, point clouds from a pose graph and camera images from a driving log are used to generate the 6D colored point clouds. In some embodiments, generation of the 6D colored point clouds includes operations such as image processing, point cloud projection, results refinement, and pose graph update.

In some embodiments, the image processing further includes interpolating poses for camera images that lack poses at some timestamps, according to poses of two neighboring images with corresponding poses. The poses corresponding to the two neighboring images are extracted from point clouds at a same or substantially similar timestamp. Additionally, overlapping images (the same, substantially the same images, or images having a similarity degree more than a particular similarity degree value) indicating a driving distance less than a particular distance value (due to, e.g., heavy traffic or waiting for green light) are filtered. Image pixel labels (such as vehicles, buildings, trees, etc.) are obtained from a pre-trained image segmentation network. In some embodiments, point cloud projection includes projecting point clouds in a point cloud coordinate system to an image coordinate system, and combining images that include colored/RGB data with the point clouds to generate six-dimensional colored point clouds. In some embodiments, results refinement includes removing points from the colored point clouds, e.g., removing points representing dynamic objects (e.g., pedestrians, vehicles, bicycles) and points having different labels between images and point clouds; selecting a point color of a point as the pixel color of the nearest image pixel when there are multiple image pixels (multiple pixel labels) corresponding to one single point; and enhancing the road marker color by adding the point cloud intensity value (e.g., obtained by LiDAR sensor) to each point in the point clouds.

By virtue of the implementation of systems, methods, and computer program products described herein, some of the advantages of these techniques include providing more accurate alignments between pixel color and points, so as to generate a colored map layer (e.g., 5D colored map tiles) to speed up the map annotation process. In examples, the colored map layer is used in a semantic mapping process, e.g., implemented by a map annotation tool. Moreover, these techniques benefit down-streaming semantic tasks, such as the lane extractor network. In particular, these techniques provide a baseline multi-modality (e.g., camera and LiDAR sensors) fusion between point cloud and images. These techniques incorporate multiple surrounding images for sensor fusion.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
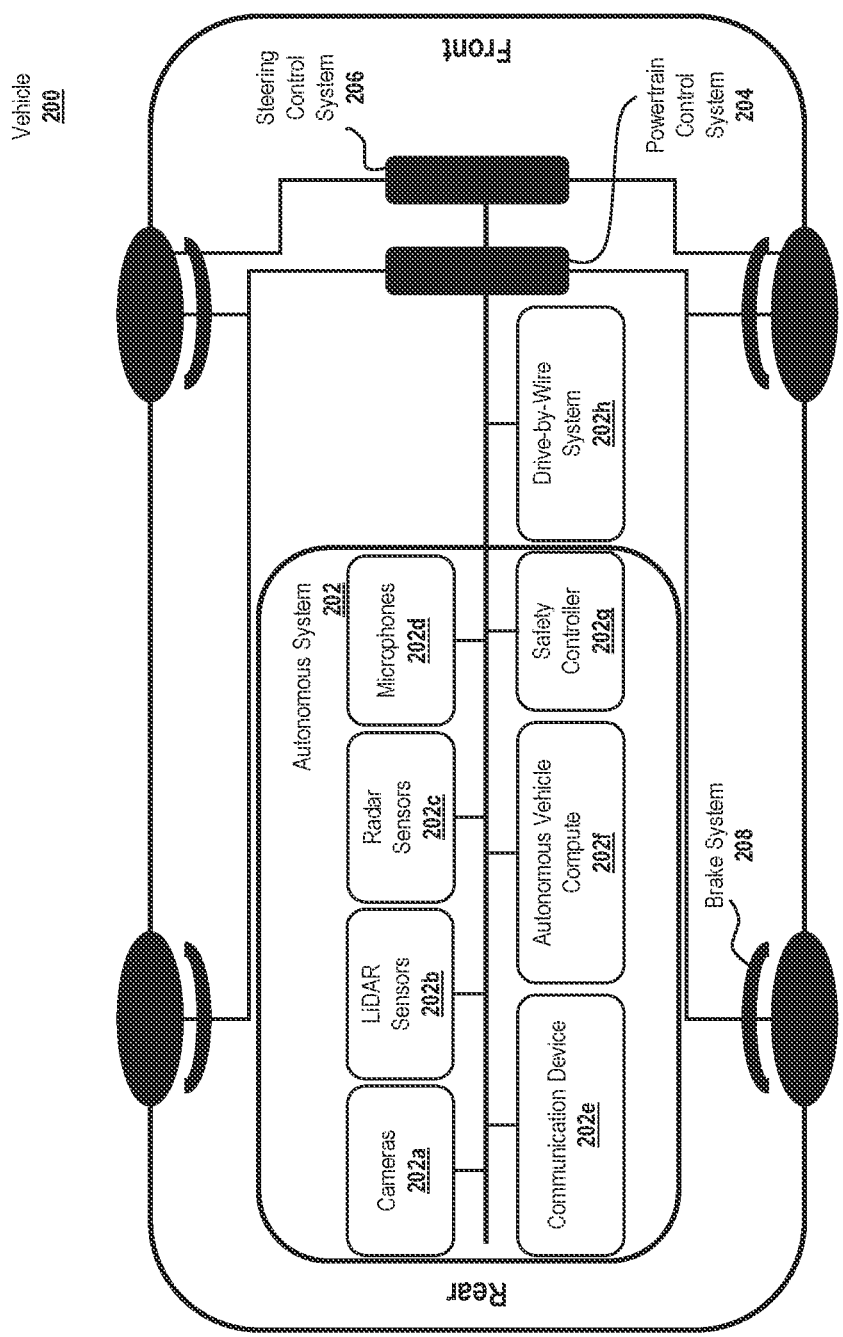
FIG. 2 is a diagram of one or more systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
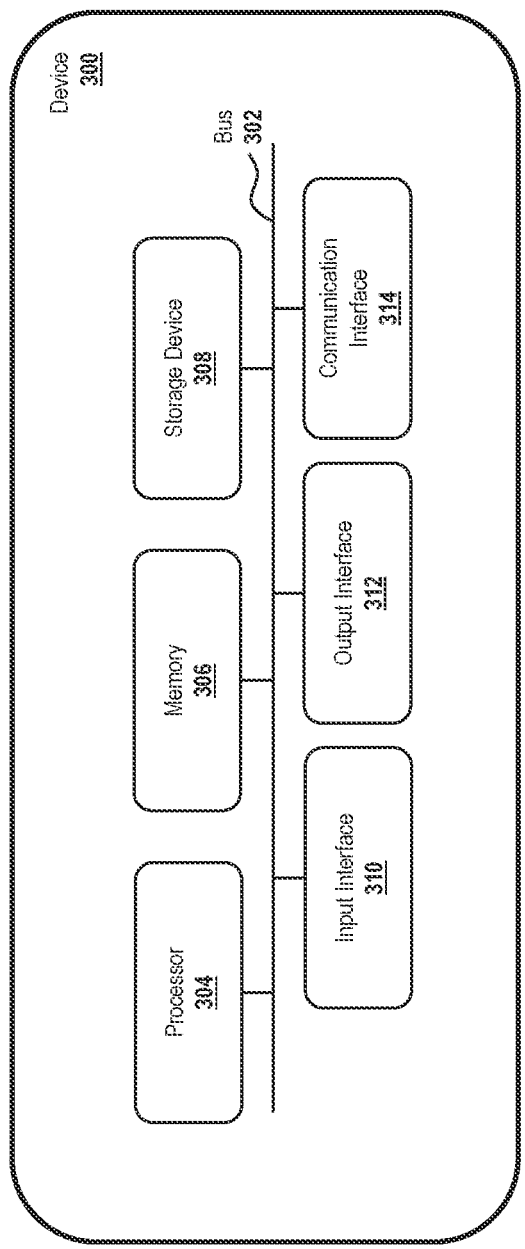
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a particular spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle (AV) compute 400, described herein. Additionally, or alternatively, in some embodiments, autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h, and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located on the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi© interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
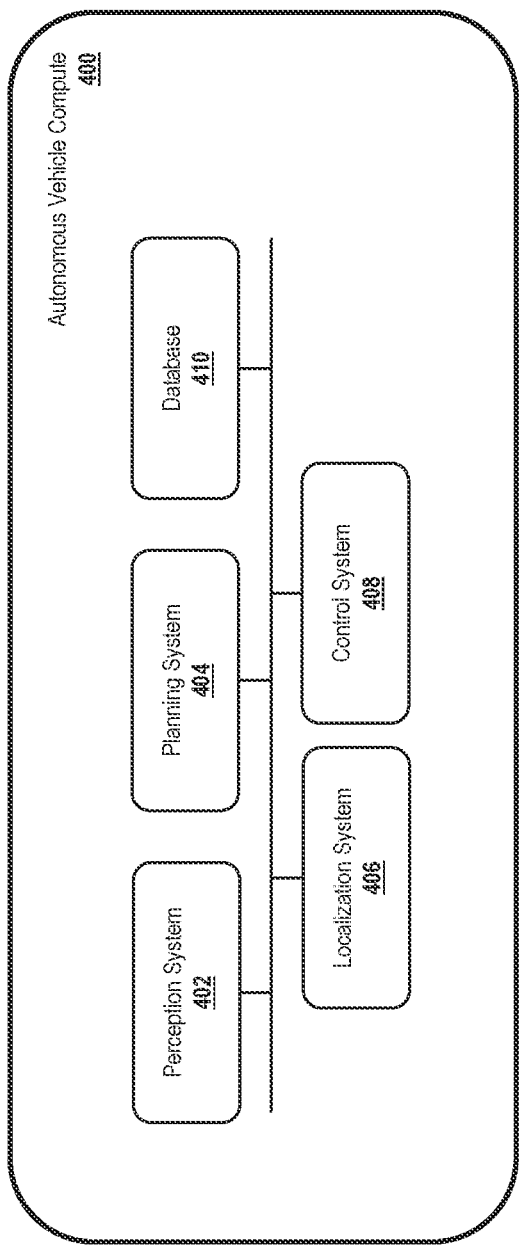
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406, and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
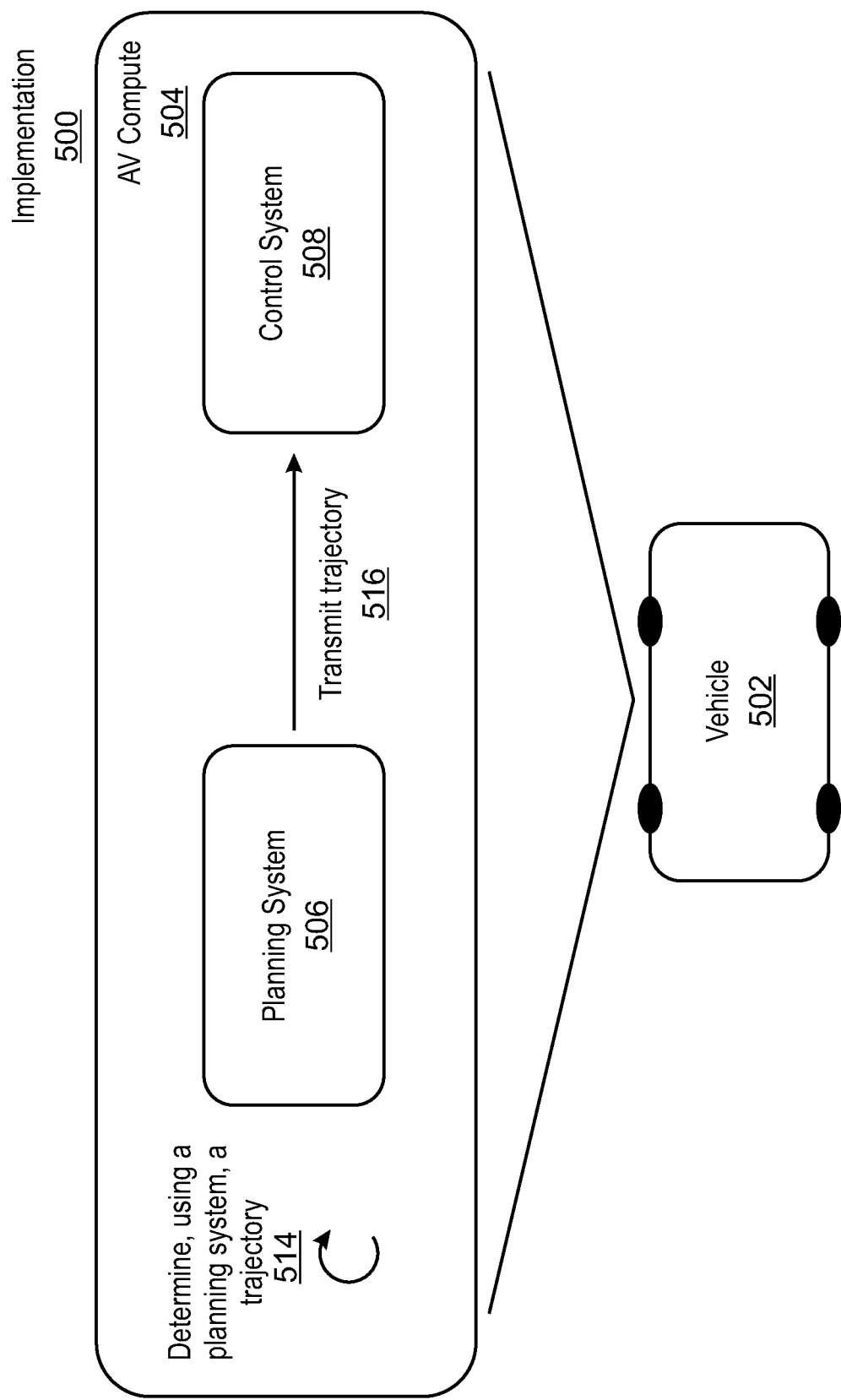
FIG. 5 is a diagram of an implementation of a process that generates a color map layer for annotation.

Referring now to FIG. 5, illustrated are diagrams of an implementation 500 of a process that generates a color map layer for annotation. In some embodiments, implementation 500 includes the autonomous system 202 of FIG. 2, including LiDAR sensors 202b and AV compute 202f. In some embodiments, data generated by the LiDAR sensors 202b is obtained by the device 300 of FIG. 3 to generate high definition (HD) maps with a color map layer.

In the implementation 500, an AV compute 504 (e.g., AV compute 202f of FIG. 2) includes a planning system 506 (e.g., planning system 404 of FIG. 4) and a control system 508 (e.g., control system 408 of FIG. 4). The planning system 506 determines a trajectory (514) for the AV to navigate. For example, the planning system 506 periodically or continuously receives data from a perception system (e.g., perception system 402 of FIG. 4) including raw sensor data associated with objects in the environment (e.g., environment 100 of FIG. 1). The planning system 506 determines at least one trajectory based on the sensor data generated by perception system 402. The trajectory is transmitted (516) to a control system that controls operation of the vehicle.

In some embodiments, the raw sensor data includes camera images (e.g., data associated with at least one image generated by at least one camera 202a) obtained as the vehicle navigates through the environment along the trajectory. In some embodiments, the raw sensor data is LiDAR data (e.g., data associated with at least one point cloud generated by at least one LiDAR sensor 202b) obtained as the vehicle navigates through the environment along the trajectory. In examples, the raw sensor data includes camera images recorded in a driving log and corresponding LiDAR data. LiDAR data is a collection of 2D or 3D points (also known as point clouds) that are used to construct a representation of the environment. In examples, a LiDAR device repeatedly scans the environment in a 360 degree sweep while the vehicle traverses the environment according to the trajectory. The rotational scan of the environment by the LiDAR is colloquially known as full sweep. The sweeps typically overlap such that the same locations are represented in the sweeps of LiDAR data (e.g., point clouds) at different timestamps. In examples, a pose graph is generated that includes nodes that represent poses of a vehicle in the environment and edges that represent transformations between consecutive poses. In examples, features (e.g., feature maps) are used to compute pose-to-pose constraints in the pose graph.

In some embodiments, the pose graph and camera images are integrated into HD maps by generating a color map layer. In examples, an HD map is a high precision map that enables computer-based navigation systems to determine precise trajectories and other information for navigation in the environment. An HD map is comprehensive and built to support safe and efficient decision-making. An HD map includes several layers, such as a standard base map layer, a geometric layer that describes roadway geometric properties and road network connectivity properties, and a semantic layer that describes roadway physical properties (e.g., the number of vehicular and cyclist traffic lanes, lane width, lane traffic directions, or lane marker types and locations, or any combinations thereof) and spatial locations of road features such as crosswalks, traffic signs or other travel signals of various types. In operation, a localization system (e.g., localization system 406) compares captured sensor data to stored maps to determine a position of a vehicle including the computer-based navigation system in the area. Creation and updating of the HD maps includes visualization of the maps so that human annotators can verify and further annotate the HD maps at a user interface (e.g., input interface 310 of FIG. 3). In examples, pose graphs derived from LiDAR data captured along the determined trajectories (514) are interpolated to generate poses at timestamps corresponding to camera image data. The color map layer is generated by fusing the poses and camera image information to generate 5D map tiles.

In examples, the base map layer is a less detailed map containing general feature information associated with the environment. For example, the base map in 2D is a standard map obtained from a third party, such as a map provider. The base map is a standardized map, without customizations. In examples, the base map is a standard definition map and does not include road geometry including connectivity properties, physical properties, and the spatial locations of road features such as crosswalks, traffic signs or other travel signals of various types. A geometric layer of an HD map describes roadway geometric properties and road network connectivity properties. The semantic layer that describes roadway physical properties (e.g., the number of vehicular and cyclist traffic lanes, lane width, lane traffic directions, or lane marker types and locations, or any combinations thereof) and spatial locations of road features such as crosswalks, traffic signs or other travel signals of various types. In operation, a localization system (e.g., localization system 406) compares captured sensor data to stored maps to determine a position of a vehicle including the computer-based navigation system in the area. Creation and updating of the HD maps includes visualization of the maps via a map annotation tool so that human annotators can verify and further annotate the HD maps at a user interface (e.g., input interface 310 of FIG. 3). In examples, the visualizations are output at an output interface (e.g., output interface 312 of FIG. 3).

Figure 6:
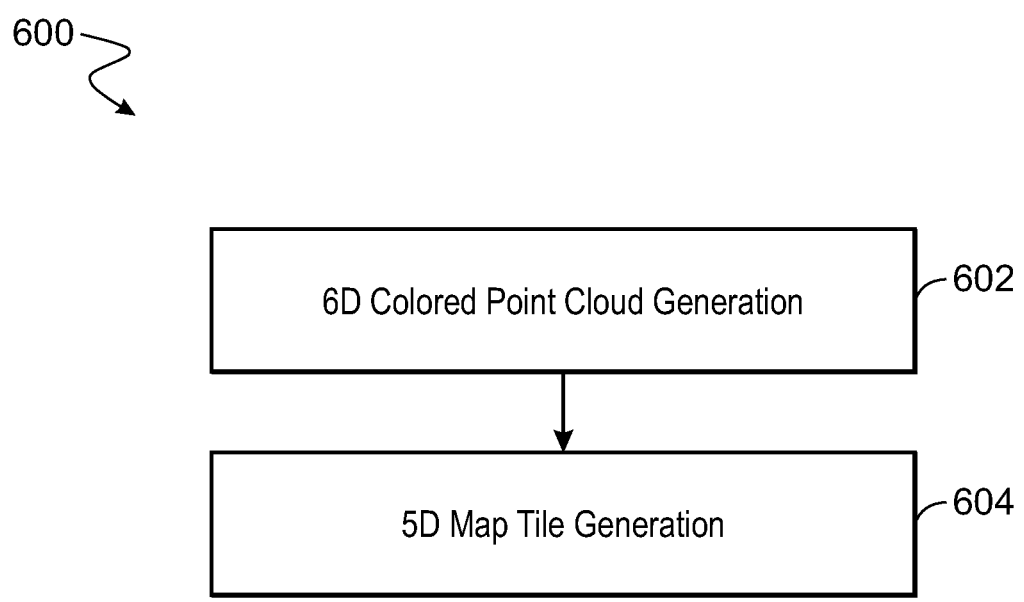
FIG. 6 is an example flow chart of a process for generating a color map layer for map annotations.

FIG. 6 is an example flow chart of a process 600 for generating a color map layer for map annotations. In some embodiments, one or more of the steps of process 600 are performed (e.g., completely, partially, and/or the like) by devices or systems (or groups of devices and/or systems) that are separate from, or include, an autonomous system. For example, one or more steps of process 600 can be performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, and/or AV compute 400 of FIG. 4 (e.g., one or more systems of AV compute 400). In some embodiments, the steps of process 600 may be performed between any of the above-noted systems in cooperation with one another.

At block 602, a device (e.g., device 300 of FIG. 3) generates six-dimensional (6D: X, Y, Z, R, G, B) point clouds based on three-dimensional (3D: X, Y, Z) point clouds from a pose graph and camera images from a driving log. The six dimensions include X coordinate, Y coordinate, Z coordinate, Red color value, Green color value, and Blue color value. The three dimensions include X coordinate, Y coordinate, and Z coordinate. The camera images include RGB color information, and the 3D point clouds from a pose graph are painted with RGB colors from the camera images to generate 6D colored point clouds. In some embodiments, the camera images are registered with 3D point clouds in the pose graph. In examples, image registration refers to transforming the camera images and 3D point clouds to a same coordinate system.

At block 604, the device transforms the 6D colored point clouds into 5D map tiles. In some embodiments, the device can transform the 6D colored point clouds into 5D map tiles by ignoring or discarding Z coordinate values.

In some embodiments, the device first removes the points having a height (e.g., a Z coordinate) larger than a particular height value (e.g., 1.8 meters) from the 6D colored point clouds, and then transforms the truncated 6D colored point clouds (the 6D colored point clouds including remaining points) into 5D map tiles by ignoring or discarding Z coordinate values. For example, some points representing green vegetation (e.g., tree limbs) are removed from the 6D colored point clouds, because green vegetation may occlude more important objects (e.g., vehicles, pedestrians, bicycles, lane markings, crosswalks, sidewalks, traffic lights, etc.) on the ground. In examples, the points representing green vegetation correspond to heights greater than 1.8 meters in the point cloud. The device then transforms the truncated 6D colored point clouds (the 6D colored point clouds including remaining points) into 5D map tiles. In an example, the device can transform the truncated 6D colored point clouds into 5D map tiles by ignoring or discarding Z coordinate values. In some embodiments, the 5D map tiles represent a top (or "birds-eye") view of a portion of an environment (or object in the environment) represented by the pose graph and camera images. The 5D map tiles (X, Y, R, G, B) are provided to a map rasterizer for map annotations. In some embodiments, the map rasterizer is software for converting an image described in a vector graphics (e.g., a 5D map tile and/or a set of 5D map tiles) format into a raster image (a series of pixels). In examples, the raster image is an array of cells or pixels organized into rows and columns (e.g., a grid) where each cell or pixel contains a value representing information.

Figure 7:
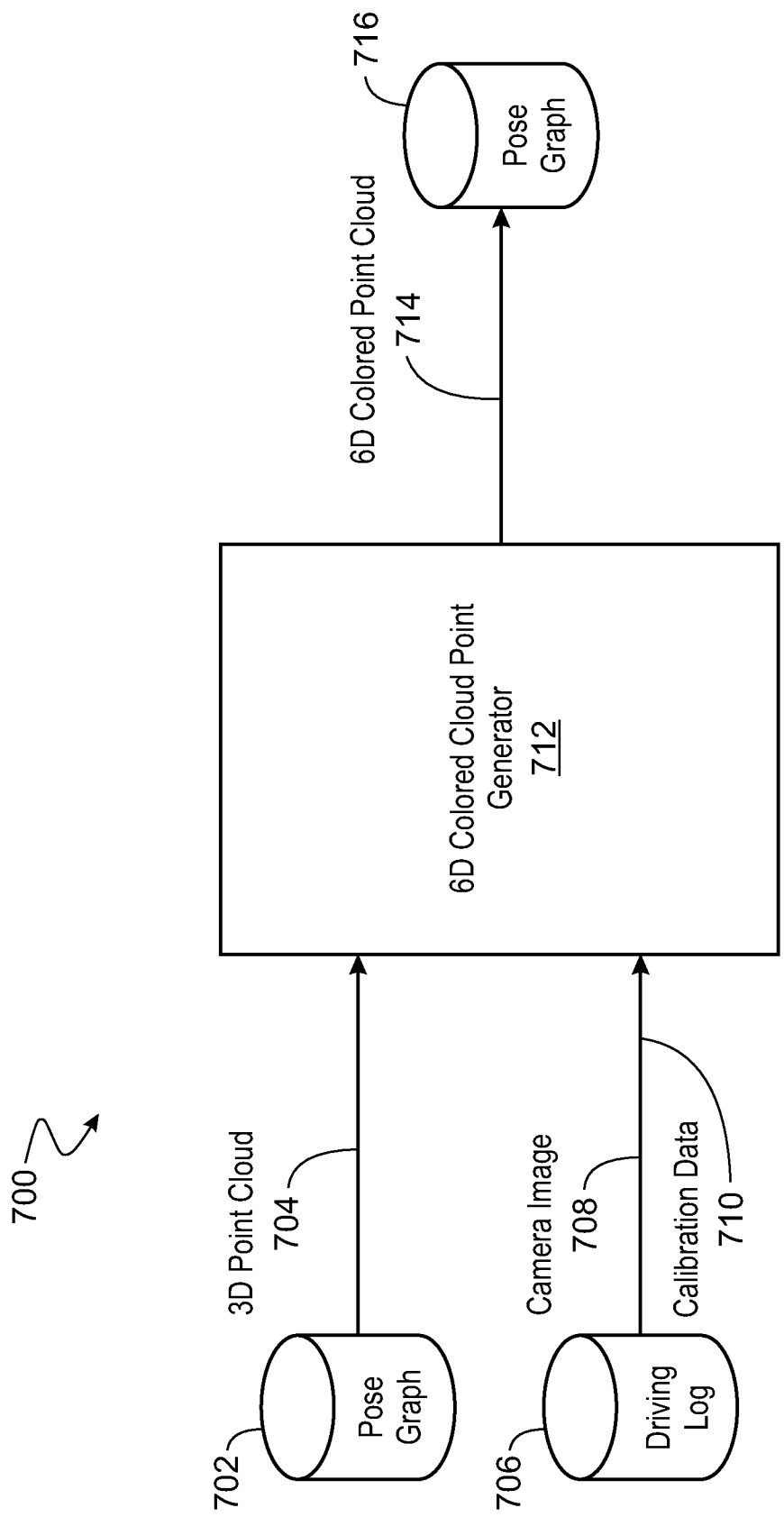
FIG. 7 is a diagram of an example architecture for generating 6D (six-dimensional) colored point clouds.

FIG. 7 is a diagram of an example architecture 700 for generating 6D colored point clouds. In some embodiments, one or more steps described as being performed by 6D colored point cloud generator 712 can be performed by one or more devices of FIGS. 1-4 (e.g., by remote AV system 114 and/or the like). As shown in FIG. 7, pose graph 702 includes 3D point clouds 704 generated by a sensor, e.g., Light Detection and Ranging (LiDAR) sensor 202b of FIG. 2 (3D point clouds 704 are elements of the pose graph 702). The combination of position (translation) and orientation (rotation) relative to a point (or set of points representing an environment) is referred to as a pose. In some embodiments, a pose can be associated with an object represented by a portion of a point cloud. The position is a 2D translation vector representing X and Y coordinates. The orientation is represented by a 2×2 matrix, which is also called a rotation matrix. The translation vector and rotation matrix can be used to represent position and orientation. The pose graph 702 includes nodes (each node representing a pose associated with a point cloud) connected by edges (each edge represents a relative pose of one point cloud relative to another). In examples, the edges represent spatial information. For example, a pose of each point cloud can include a position or an orientation of the vehicle (a position or an orientation where each camera image 708 is captured) relative to other features (e.g., trees, buildings, etc.) and an environment in which the vehicle and other features are located.

Driving log 706 includes camera images 708 captured by a camera 202a of FIG. 2 and calibration data 710. The calibration data 710 includes transformation matrices (K, R, t) between point clouds generated by LiDAR sensors (e.g., LiDAR sensors 202b of FIG. 2) and camera images captured by cameras (e.g., cameras 202a of FIG. 2). LiDAR sensors and cameras are installed at different positions in AV. The transformation matrices provide information indicating relative positions of LiDAR sensors and cameras.

The 3D point clouds 704, the camera images 708, and the calibration data 710 are input into 6D colored point cloud generator 712 (implemented as one or more devices of FIGS. 1-4 (e.g., by remote AV system 114 and/or the like). The camera images 708 include RGB color information, and the 3D point clouds 704 from a pose graph 702 are painted with RGB colors from the camera images 708 to generate 6D colored point clouds 714. The 6D colored point cloud generator 712 outputs a 6D colored point cloud 714. The 6D colored point cloud 714 is then stored in pose graph 716. In some embodiments, the 6D colored point cloud generator 712 performs some of or all of image processing of FIG. 8, point cloud projection of FIG. 9, results refinement of FIG. 10, and pose graph update of FIG. 10 to generate the 6D colored point cloud 714.

In some embodiments, the pose graph 716 and the pose graph 702 can be the same pose graph. The 6D colored point cloud 714 can replace the 3D point cloud 704 in the pose graph 702 (or a portion thereof). In some embodiments, the pose graph 716 and the pose graph 702 can be different pose graphs.

Figure 8:
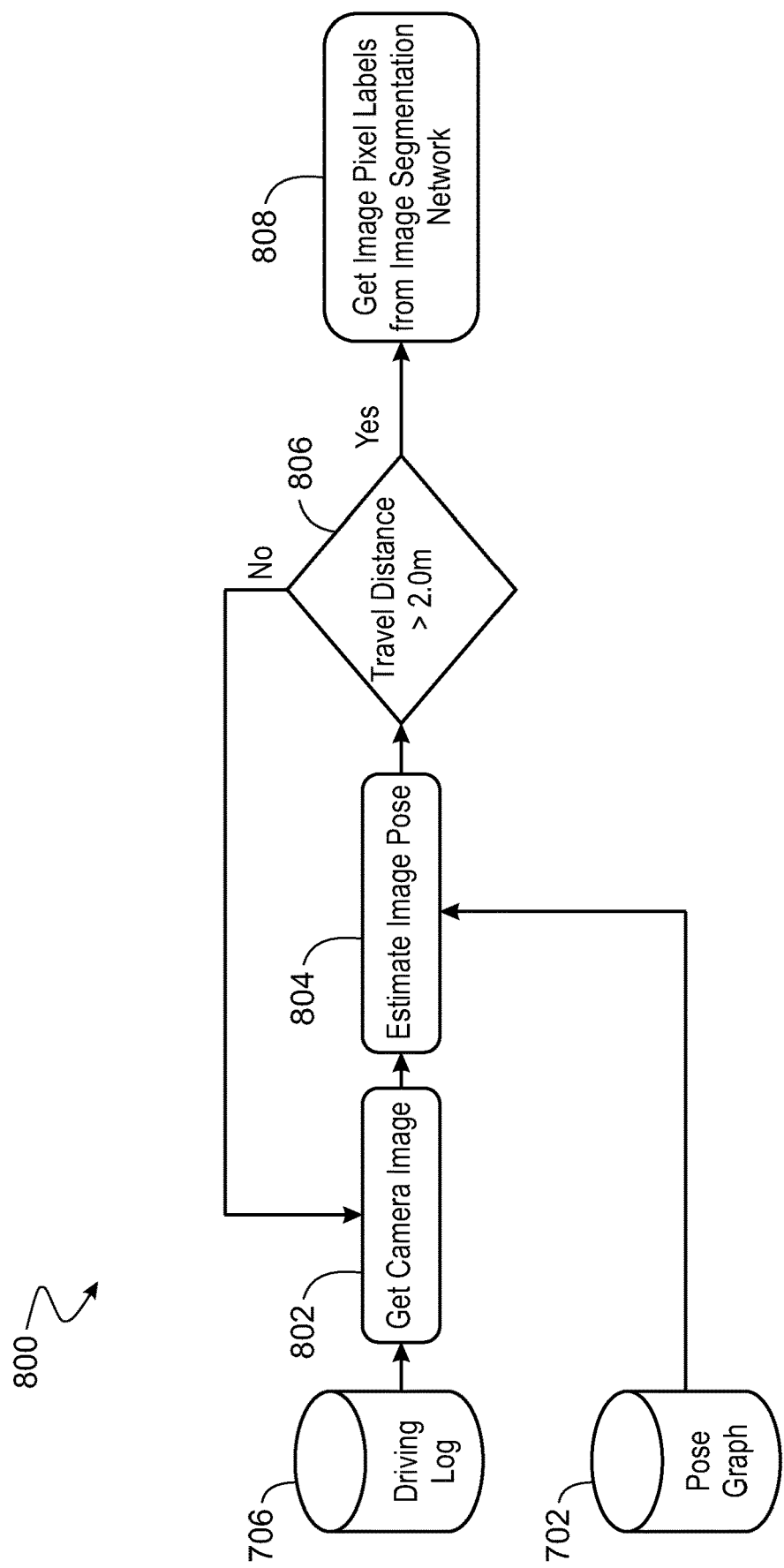
FIG. 8 is an example flow chart of a process for image processing.

FIG. 8 is an example flow chart of a process 800 for image processing. In some embodiments, one or more of the steps of process 800 are performed (e.g., completely, partially, and/or the like) by another device or system, or another group of devices and/or systems that are separate from, or include, the autonomous system. For example, one or more steps of process 800 can be performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, AV compute 400 of FIG. 4 (e.g., one or more systems of AV compute 400), and/or the 6D colored point cloud generator 712 of FIG. 7.

In some embodiments, the steps of process 800 may be performed between any of the above-noted systems in cooperation with one another.

In some embodiments, at block 802, the device obtains camera images (e.g., camera images 708 of FIG. 7, captured by one or more cameras 202a of FIG. 2) of an AV from the driving log 706.

At block 804, a first pose for a first camera image at a first timestamp is estimated. The first camera image is associated with the first timestamp, and the pose graph does not include poses at the first timestamp. In examples, the first pose is estimated according to the poses corresponding to two neighboring camera images (these two neighboring camera images have two corresponding 3D point clouds from the pose graph 702). In examples, the first pose is estimated from the poses corresponding to the two closest camera images (these two neighboring camera images). The pose refers to a position and orientation of sensor data. In some embodiments, not all the camera images captured by cameras (e.g., cameras 202a of FIG. 2) have corresponding poses in a pose graph (e.g., pose graph 702 of FIG. 7), because the camera frequency is different from LiDAR sensor frequency. Key camera images have corresponding point clouds (there are point clouds generated when the key camera images are captured, i.e., key camera images and the corresponding point clouds are captured simultaneously). The corresponding point clouds are used to extract poses for inclusion in the pose graph. As to non-key camera images that do not have corresponding point clouds (there are no point clouds generated when the non-key camera images are captured, and thus no matching pose is found in the pose graph), a pose for each non-key camera image can be estimated according to poses corresponding to two neighboring key camera images (these two neighboring key camera images have two corresponding poses in the pose graph).

The neighboring poses are obtained from the pose graph at timestamps that correspond to the two neighboring camera images. The two neighboring camera images are the two camera images closest to the first camera image having no corresponding pose in the pose graph. There is a time stamp for every camera image or every point cloud. The two neighboring poses include a second pose corresponding to a second key image having a second time stamp immediately earlier than that of a particular non-key camera image (e.g., the first camera image) and a third pose corresponding to a third key image having a time stamp immediately later than that of the particular non-key camera image (e.g., the first camera image), and are used to estimate the first pose of the particular non-key camera image (e.g., the first camera image). The two neighboring poses are poses extracted from two different point clouds (the second point cloud corresponding to the second key image and the third point cloud corresponding to the third key image). In examples, the second point cloud and the third point cloud have sequential timestamps and are obtained from a same LiDAR device.

Pose estimation is done through linear interpolation. An intermediate time stamp of the particular non-key camera image (e.g., the first camera image) is provided between two time stamps of the two neighboring key camera images (e.g., the second camera image and the third camera image). The corresponding intermediate pose (e.g., the first pose) of the particular non-key camera image is calculated using linear polynomials within a pose range of the two neighboring key camera images.

At block 806, the device filters out large-overlapping camera images according to a particular travel distance indicated in the overlapping camera images. In some embodiments, the same camera images, substantially the same camera images, or camera images having a similarity degree more than a particular similarity degree value are filtered out or removed. For example, the camera images captured within a particular travel distance (e.g., two meters) are filtered out or removed, because these camera images may be the same, substantially the same, or similar to each other. If the obtained camera images 708 are all within the particular travel distance, then the device performs the block 802 again to obtain new camera images 708.

At block 808, the device obtains image pixel labels (such as cars, buildings, trees, etc.) from a pre-trained image segmentation network. The device identifies objects (such as cars, pedestrians, buildings, trees, lane markings, traffic lights, etc.) and provides an image pixel label (e.g., pedestrian, road, building, car, tree, etc.) for each object. Image segmentation is a process of dividing a camera image into multiple segments. In this process, every pixel in the camera image is associated with an object type.

Figure 9:
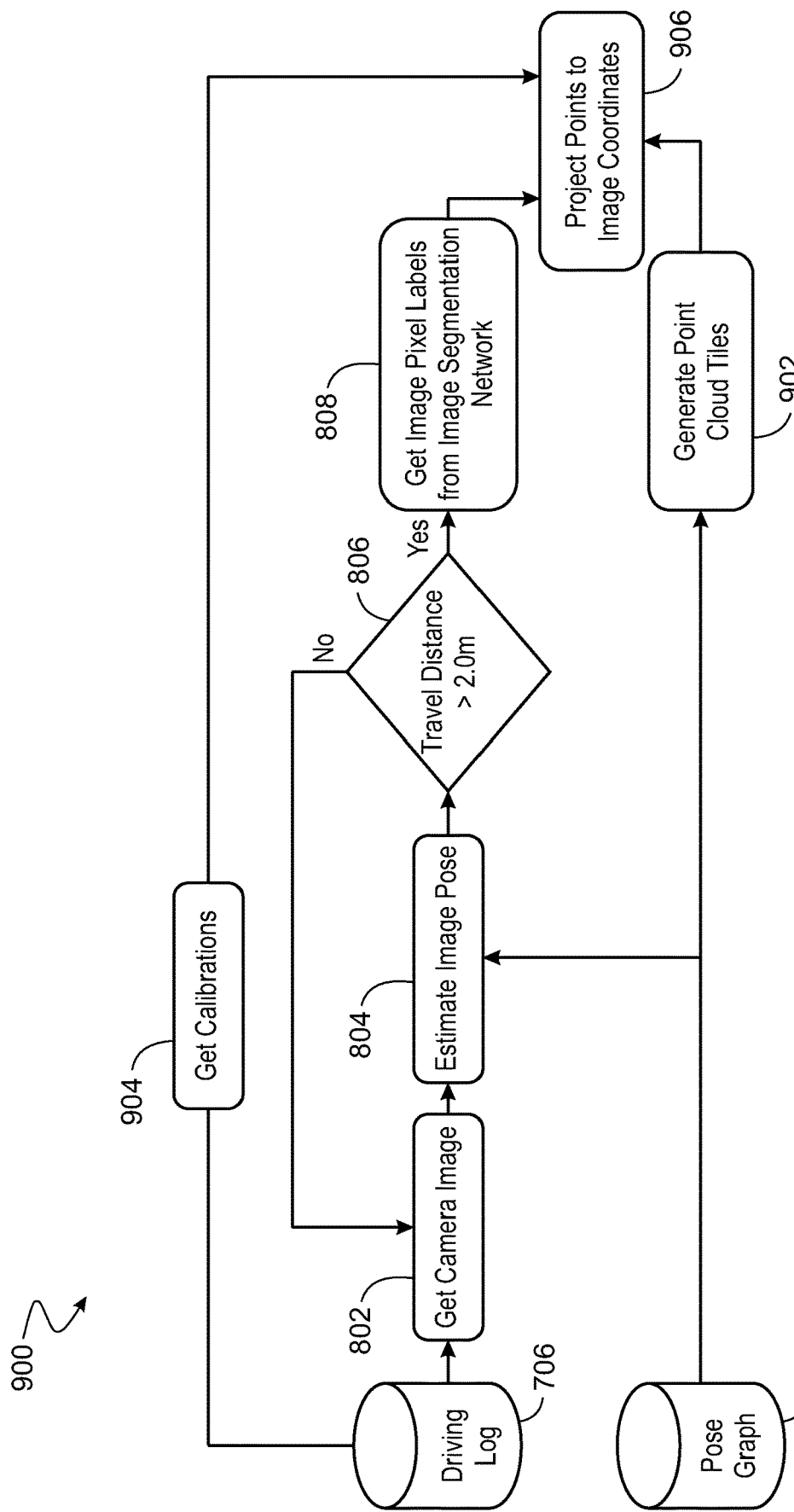
FIG. 9 is an example flow chart of a process for point cloud projection.

FIG. 9 is an example flow chart of a process 900 for point cloud projection. In some embodiments, one or more of the steps of process 900 are performed (e.g., completely, partially, and/or the like) by another device or system, or another group of devices and/or systems that are separate from, or include, the autonomous system. For example, one or more steps of process 900 can be performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, AV compute 400 of FIG. 4 (e.g., one or more systems of AV compute 400), and/or the 6D colored point cloud generator 712 of FIG. 7. In some embodiments, the steps of process 900 may be performed between any of the above-noted systems in cooperation with one another.

In some embodiments, at block 902, the device obtains point cloud tiles (3D point clouds having corrected poses) from the pose graph (e.g., pose graph 702 of FIG. 7). The 3D point clouds having corresponding corrected poses are extracted from the pose graph by Structured Query Language (SQL) queries. For example, the queries are commands or instructions in a domain-specific language used for managing data held in a relational database management system. The queries enable communications with a database to perform tasks, functions, and queries with data. In examples, the queries can be used to search the database and to do other functions like creating tables, adding data to tables, modifying data, and dropping tables. The pose graph includes "corrected poses". The poses of raw point clouds obtained from Lidar sensors are not accurate when they are projected to a world coordinate system, because the positions of AVs may get drifted after a long-time driving. A Simultaneous Localization and Mapping (SLAM) algorithm is introduced to make a global optimization on all the point clouds poses, to obtain point clouds having corrected poses. SLAM is an algorithm that enables simultaneous real-time construction of a surrounding map and localization on the map. The point cloud tiles include 3D point clouds having corresponding corrected poses.

At block 904, the device obtains calibration data (can be referred to as "transformation data"), from the driving log (e.g., driving log 706 of FIG. 7), for transforming the point cloud tiles. The calibration data includes transformation matrices (K, R, t) between point clouds generated by LiDAR sensors (e.g., LiDAR sensors 202*b* of FIG. 2) and camera images captured by cameras (e.g., cameras 202*a* of FIG. 2). The transformation matrices (K, R, t) are used to project point clouds from 3D coordinates to 2D image coordinates. K is an intrinsic matrix for a camera (e.g., cameras 202*a* of FIG. 2); R is a rotation matrix; and t is a translation vector. The intrinsic matrix for a camera (K) includes fixed parameters once a camera is manufactured, and K is provided by the camera manufacturer. The rotation matrix (R) and translation vector (t) represent the relative positions between LiDAR(s) and camera(s) in an AV. A distance and an angle between the LiDAR(s) and camera(s) can be measured through a measuring device (e.g., a ruler or something similar).

At block 906, the device projects points of the 3D point cloud to image coordinates. The 3D point cloud is in a point cloud coordinate system, which is different from the image coordinate system. In some embodiments, the points of the 3D point cloud are projected to the 2D image coordinate system by a pinhole camera model, so as to determine a pixel coordinate for each point.

The pinhole camera model is represented by Equation 1 below. The pinhole camera model is used to map from a 3D scene to a 2D image. The calibration data obtained at block 904 includes the values of K, R, and t in Equation 1.

$$x=K[Rt]X \quad \text{(Equation 1)}$$

Wherein X is 3D point cloud coordinates; x is 2D image coordinates; K is an intrinsic matrix for a camera (e.g., cameras 202*a* of FIG. 2); R is a rotation matrix; t is a translation vector. K represents parameters of the camera, such as its focal length. K is used to project 3D points from the camera coordinate to 2D positions on the same image plane. R represents an orientation of the 3D point cloud with respect to the image coordinates. t represents a position of the 3D point cloud with respect to the image coordinates. The 3D point cloud tiles obtained at block 902 are multiplied (using Equation 1) by the calibration data obtained at block 904, to output 2D image coordinates.

Figure 10:
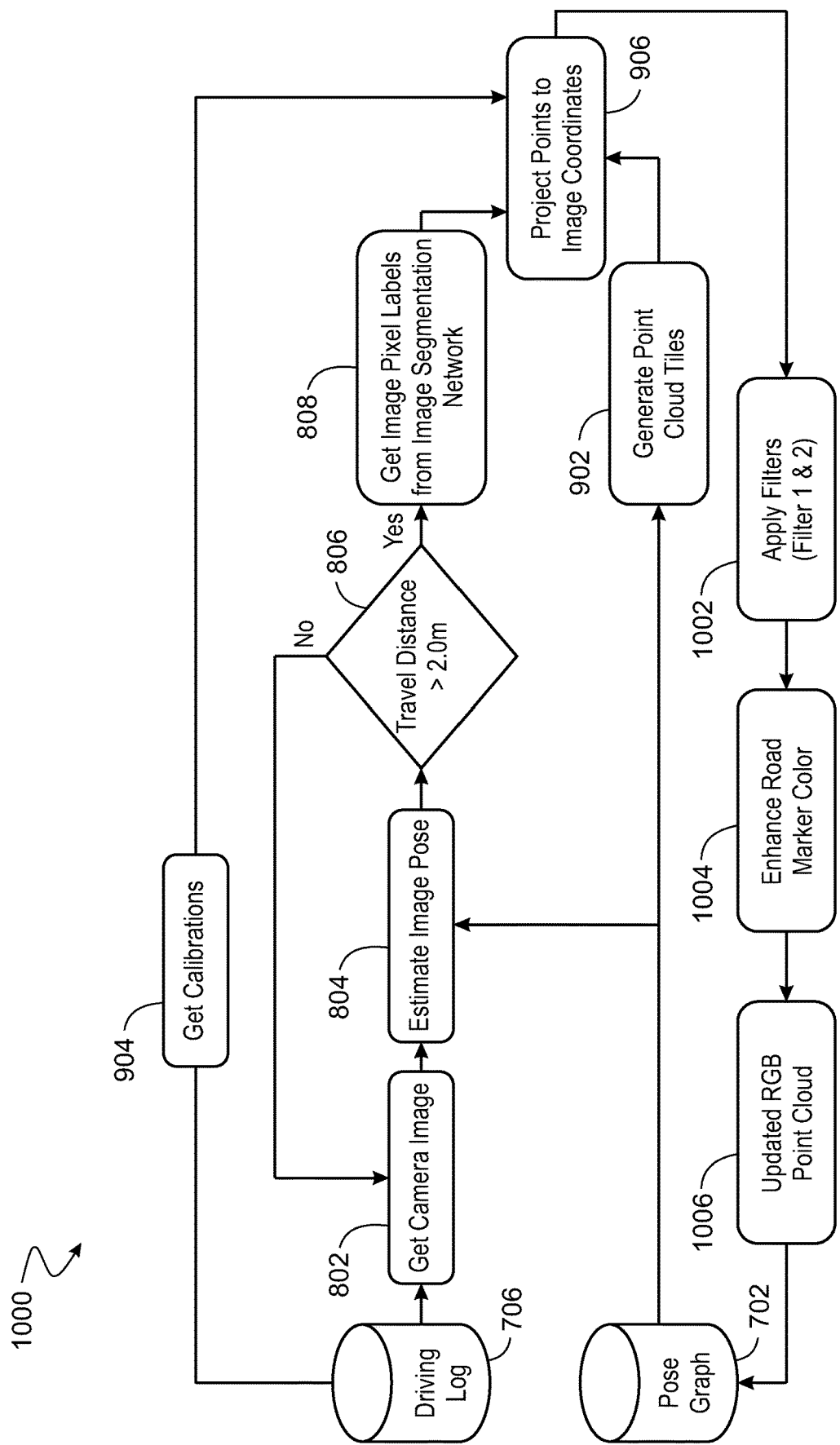
FIG. 10 is an example flow chart of a process for results refinement.

FIG. 10 is an example flow chart of a process 1000 for results refinement. In some embodiments, one or more of the steps of process 1000 are performed (e.g., completely, partially, and/or the like) by another device or system, or another group of devices and/or systems that are separate from, or include, the autonomous system. For example, one or more steps of process 1000 can be performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, AV compute 400 of FIG. 4 (e.g., one or more systems of AV compute 400), and/or the 6D colored point cloud generator 712 of FIG. 7. In some embodiments, the steps of process 1000 may be performed between any of the above-noted systems in cooperation with one another.

In some embodiments, at block 1002, a device applies a first filter to filter out or remove points corresponding to dynamic objects (e.g., pedestrians, vehicles), which may be unnecessary for annotating a map. The device applies a first filter to further filter out or remove points having different labels (semantic labels such as pedestrian, road, building, car, tree, etc.) between camera images and point clouds. The semantic labels for image pixels and point clouds are obtained from object detection networks. In examples, the object detection networks detect instances of objects of a certain classification (such as pedestrians, buildings, or vehicles). The semantic labels are derived from semantic segmentation, which assigns a classification label to each pixel. Semantic labels are determined using image based object detection, LiDAR based object detection, or any combinations thereof. In examples, there is some misalignment for the aligned image pixels and point clouds.

The device applies a second filter to identify points having at least two different pixel labels (points having at least two aligned image pixels). For each point having at least two different pixel labels, the device selects a pixel label (an image pixel) whose distance is nearest to this point. For example, a pose of each image pixel can be obtained from the driving log (e.g., calibration data 710 in driving log 706 of FIG. 7). A distance between an image pixel and a point is square root of a position difference between the image pixel and the point. The device assigns each point with the pixel color (R, G, B) from the nearest image pixel.

At block 1004, the device enhances a road marker color by adding intensity values to points corresponding to road markers. In examples, the road markers are devices or indicators applied to roads that dictate traffic flow and/or control. In examples, the road markers are raised devices or signs along a road. Additionally, in examples, the road markers are painted lines, indicators, or other graphics on the pavement of a road. Each point in the 3D (X, Y, Z) point cloud (e.g., 3D point cloud 704 of FIG. 7) is assigned a pixel color (R, G, B) to generate a 6D (X, Y, Z, R, G, B) colored point cloud (e.g., 6D colored point cloud 714 of FIG. 7).

At block 1006, the 6D colored point cloud (the updated colored point cloud) is stored in the pose graph (e.g., pose graph 702 of FIG. 7) to replace the 3D point cloud.

Figure 11:
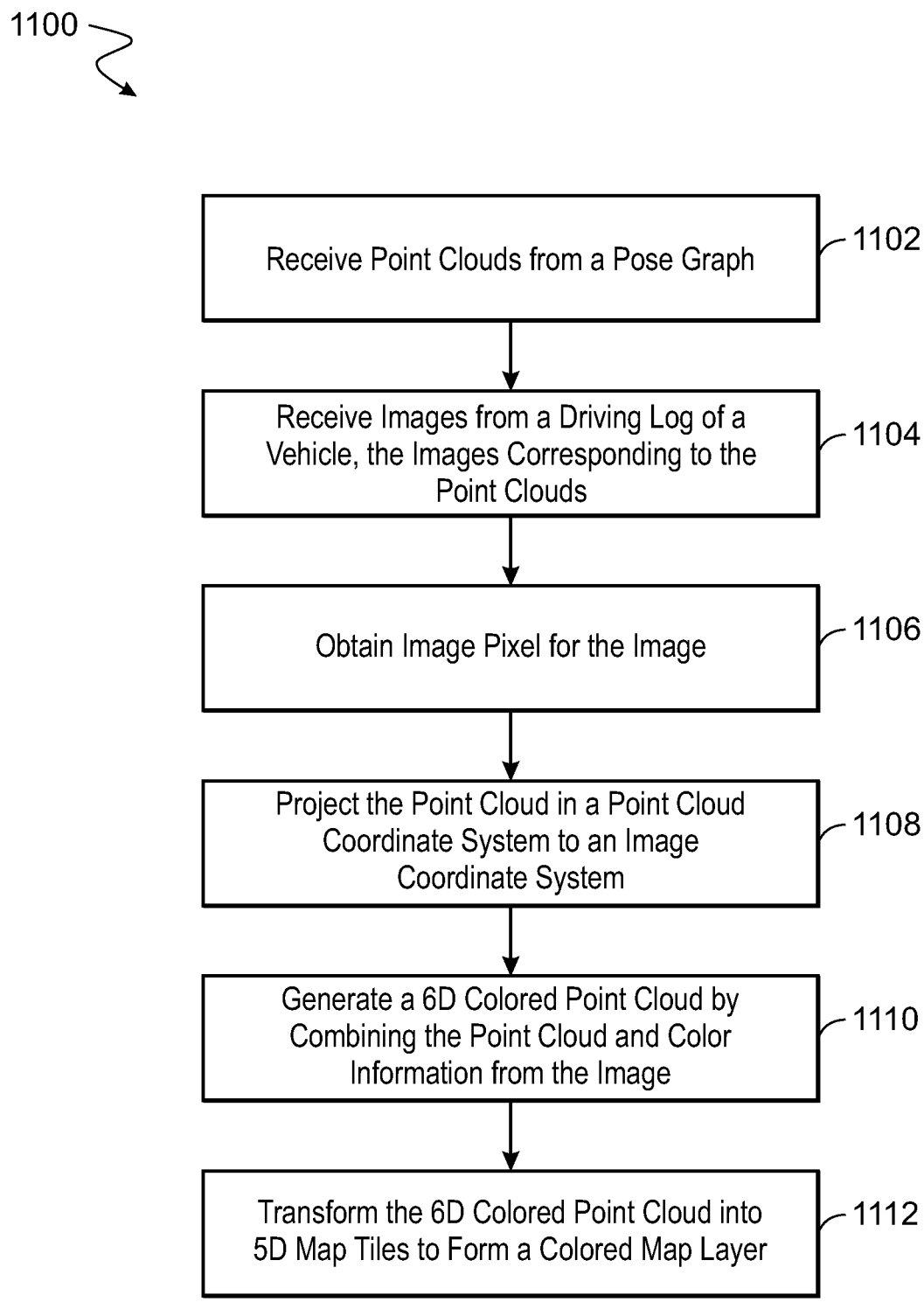
FIG. 11 is an example flow chart of a process for generating a color map layer for map annotations.

FIG. 11 is an example flow chart of a process 1100 for generating a color map layer for map annotations. In some embodiments, one or more of the steps of process 1100 are performed (e.g., completely, partially, and/or the like) by another device or system, or another group—of devices and/or systems that are separate from, or include, the autonomous system. For example, one or more steps of process 1100 can be performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, AV compute 400 of FIG. 4 (e.g., one or more systems of AV compute 400), and/or the 6D colored point cloud generator 712 of FIG. 7. In some embodiments, the steps of process 1100 may be performed between any of the above-noted systems in cooperation with one another.

In some embodiments, at block 1102, a processor (e.g., the processor 304 of FIG. 3) receives point clouds (e.g., 3D point clouds 704 of FIG. 7) from a pose graph (e.g., pose graph 702 of FIG. 7).

At block 1102, the processor receives, 3D point clouds from a pose graph (e.g., pose graph 702 of FIG. 7) of a vehicle. The pose graph includes 3D point clouds having corresponding poses. The 3D point clouds are generated by one or more LiDAR sensors (e.g., LiDAR sensors 202*b*) on the vehicle. The one or more LiDAR sensors are detecting objects while the vehicle is moving.

At block 1104, the processor receives camera images from a driving log (e.g., driving log 706 of FIG. 7) of a vehicle. Some camera images correspond to 3D point clouds from the pose graph (e.g., a respective camera image has the same or substantially the same timestamp as that of a 3D point cloud). The camera images are captured by one or more cameras (e.g., cameras 202*a* of FIG. 2) on the vehicle while the vehicle is moving.

At block 1106, the processor obtains image pixel labels for the camera images. For example, a pre-trained image segmentation network (e.g., image segmentation network at block 808 of FIG. 8) can segment each camera image and generate a pixel label or pixel color for each pixel of each camera image.

At block 1108, the processor projects the 3D point clouds in a point cloud coordinate system to an image coordinate system, through, e.g., a pinhole camera model. The point cloud coordinate system is three-dimensional (X, Y, Z), while the image coordinate system is two-dimensional (X, Y). The Z coordinate is ignored.

At block 1110, the processor generates 6D colored point clouds by combining the 3D point clouds and color information (e.g., RGB data) from the camera images. The point clouds are projected to the image coordinate system at block 1106, and thus the color information can be added into or combined with the 3D point clouds to generate 6D colored point clouds (X, Y, Z, R, G, B).

At block 1112, the processor transforms the 6D colored point clouds into 5D (X, Y, R, G, B) map tiles to form a colored map layer. The 6D colored point clouds can be transformed into 5D map tiles by ignoring Z coordinate values. In some embodiments, the processor removes the points having a height larger than a particular height value (e.g., 1.8 meters) from the 6D colored point clouds. The device 300 then transforms the truncated 6D colored point clouds (i.e., the 6D colored point clouds including remaining points) into 5D map tiles by ignoring Z coordinate values. The 5D map tiles (i.e., the colored map layer) are provided to a map annotation tool (e.g., map rasterizer) for map annotations.

The techniques of this disclosure can provide accurate alignments between color and points. A colored map layer is provided to speed up a map annotation process. The techniques of this disclosure can be beneficial for down-streaming semantic tasks, such as a lane extractor network, by providing a baseline multi-model fusion between point clouds and camera images and incorporating multiple surrounding camera images for sensor fusion.

According to some non-limiting embodiments or examples, provided is a method, comprising A method, comprising: receiving, with at least one processor, a point cloud from a pose graph; receiving, with the at least one processor, an image from a driving log of a vehicle, the image corresponding to the point cloud from the pose graph; obtaining, with the at least one processor, image pixel labels for the image; projecting, with the at least one processor, the point cloud in a point cloud coordinate system to an image coordinate system based on the image pixel labels; generating, with the at least one processor, a six-dimensional colored point cloud by combining the point cloud and color information from the image; and transforming, with the at least one processor, the six-dimensional colored point cloud into five-dimensional map tiles to form a colored map layer.

According to some non-limiting embodiments or examples, provided is a system, comprising at least one processor; and a memory storing instructions thereon that, when executed by the at least one processor, cause the at least one processor to perform operations, comprising: receiving a point cloud from a pose graph; receiving an image from a driving log of a vehicle, the image corresponding to the point cloud from the pose graph; obtaining image pixel labels for the image; projecting the point cloud in a point cloud coordinate system to an image coordinate system based on the image pixel labels; generating a six-dimensional colored point cloud by combining the point cloud and color information from the image; and transforming the six-dimensional colored point cloud into five-dimensional map tiles to form a colored map layer.

According to some non-limiting embodiments or examples, provided is a non-transitory, computer-readable storage medium having instructions stored thereon, that when executed by at least one processor, cause the at least one processor to perform operations, comprising: receiving a point cloud from a pose graph; receiving an image from a driving log of a vehicle, the image corresponding to the point cloud from the pose graph; obtaining image pixel labels for the image; projecting the point cloud in a point cloud coordinate system to an image coordinate system based on the image pixel labels; generating a six-dimensional colored point cloud by combining the point cloud and color information from the image; and transforming the six-dimensional colored point cloud into five-dimensional map tiles to form a colored map layer.

Clause 1: A method, comprising: receiving, with at least one processor, a point cloud from a pose graph; receiving, with the at least one processor, an image from a driving log of a vehicle, the image corresponding to the point cloud from the pose graph; obtaining, with the at least one processor, image pixel labels for the image; projecting, with the at least one processor, the point cloud in a point cloud coordinate system to an image coordinate system based on the image pixel labels; generating, with the at least one processor, a six-dimensional colored point cloud by combining the point cloud and color information from the image; and transforming, with the at least one processor, the six-dimensional colored point cloud into five-dimensional map tiles to form a colored map layer.

Clause 2: The method of Clause 1, further comprising: receiving calibration data from the driving log of the vehicle, wherein the calibration data includes transformation matrices including an intrinsic matrix for a camera, a rotation matrix and a translation vector; and projecting the point cloud to the image coordinate system based on the calibration data.

Clause 3: The method of Clause 1 or 2, wherein the image pixel labels are obtained from a pre-trained image segmentation network.

Clause 4: The method of any one of Clauses 1-3, further comprising: interpolating a pose of the image according to poses of two neighboring images, wherein the two neighboring images correspond to two point clouds, wherein the two point clouds include a first point cloud having a time stamp immediately earlier than that of the image and a second point cloud having a time stamp immediately later than that of the image.

Clause 5: The method of any one of Clauses 1-4, further comprising: filtering out overlapping images according to a particular driving distance indicated in the overlapping images.

Clause 6: The method of any one of Clauses 1-5, wherein projecting the point cloud comprises: projecting the point cloud by a pinhole camera model.

Clause 7: The method of any one of Clauses 1-6, further comprising: removing, from the point cloud, points that have different labels between the points and the corresponding image pixels.

Clause 8: The method of any one of Clauses 1-7, further comprising: removing, from the point cloud, points representing dynamic objects including one or more of pedestrians, bicycles, or vehicles.

Clause 9: The method of any one of Clauses 1-8, wherein projecting the point cloud further comprises: assigning, a point color of a point in the point cloud, with a pixel color from the nearest image pixel when the point has at least two different image pixels.

Clause 10: The method of any one of Clauses 1-9, further comprising: enhancing a road marker color by adding an intensity value to each point in the point cloud.

Clause 11: The method of any one of Clauses 1-10, further comprising: updating the pose graph with the six-dimensional colored point cloud.

Clause 12: The method of any one of Clauses 1-11, wherein transforming the six-dimensional colored point cloud into the five-dimensional map tiles comprises: removing, from the six-dimensional colored point cloud, points corresponding to an object having a height larger than a particular height value; and transforming the six-dimensional colored point cloud into the five-dimensional map tiles by ignoring Z coordinate values.

Clause 13: A system, comprising at least one processor; and a memory storing instructions thereon that, when executed by the at least one processor, cause the at least one processor to perform operations, comprising: receiving a point cloud from a pose graph; receiving an image from a driving log of a vehicle, the image corresponding to the point cloud from the pose graph; obtaining image pixel labels for the image; projecting the point cloud in a point cloud coordinate system to an image coordinate system based on the image pixel labels; generating a six-dimensional colored point cloud by combining the point cloud and color information from the image; and transforming the six-dimensional colored point cloud into five-dimensional map tiles to form a colored map layer.

Clause 14: The system of Clause 13, the operations further comprising: receiving calibration data from the driving log of the vehicle, wherein the calibration data includes transformation matrices including an intrinsic matrix for a camera, a rotation matrix and a translation vector; and projecting the point cloud to the image coordinate system based on the calibration data.

Clause 15: The system of Clause 13 or 14, the operations further comprising: interpolating a pose of the image according to poses of two neighboring images, wherein the two neighboring images correspond to two point clouds, wherein the two point clouds include a first point cloud having a time stamp immediately earlier than that of the image and a second point cloud having a time stamp immediately later than that of the image.

Clause 16: The system of any one of Clauses 13-15, further comprising: removing, from the point cloud, points that have different labels between the points and the corresponding image pixels.

Clause 17: The system of any one of Clauses 13-16, further comprising: removing, from the point cloud, points representing dynamic objects including one or more of pedestrians, bicycles, or vehicles.

Clause 18: The system of any one of Clauses 13-17, wherein projecting the point cloud further comprises: assigning, a point color of a point in the point cloud, with a pixel color from the nearest image pixel when the point has at least two different image pixels.

Clause 19: The system of any one of Clauses 13-18, wherein transforming the six-dimensional colored point cloud into the five-dimensional map tiles comprises: removing, from the six-dimensional colored point cloud, points corresponding to an object having a height larger than a particular height value; and transforming the six-dimensional colored point cloud into the five-dimensional map tiles by ignoring Z coordinate values.

Clause 20: A non-transitory, computer-readable storage medium having instructions stored thereon, that when executed by at least one processor, cause the at least one processor to perform operations, comprising: receiving a point cloud from a pose graph; receiving an image from a driving log of a vehicle, the image corresponding to the point cloud from the pose graph; obtaining image pixel labels for the image; projecting the point cloud in a point cloud coordinate system to an image coordinate system based on the image pixel labels; generating a six-dimensional colored point cloud by combining the point cloud and color information from the image; and transforming the six-dimensional colored point cloud into five-dimensional map tiles to form a colored map layer.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    receiving, with at least one processor, a point cloud from a pose graph;
    receiving, with the at least one processor, an image from a driving log of a vehicle, the image corresponding to the point cloud from the pose graph;
    obtaining, with the at least one processor, image pixel labels for the image;
    interpolating, with the at least one processor, a pose of the image according to poses of two neighboring images, wherein the two neighboring images correspond to two point clouds, wherein the two point clouds include a first point cloud having a time stamp immediately earlier than a time stamp of the image and a second point cloud having a time stamp immediately later than the time stamp of the image;
projecting, with the at least one processor, the point cloud in a point cloud coordinate system to an image coordinate system based on the image pixel labels;
generating, with the at least one processor, a six-dimensional colored point cloud by combining the point cloud and color information from the image; and
transforming, with the at least one processor, the six-dimensional colored point cloud into five-dimensional map tiles to form a colored map layer.

2. The method of claim 1, further comprising:
receiving calibration data from the driving log of the vehicle, wherein the calibration data includes transformation matrices including an intrinsic matrix for a camera, a rotation matrix and a translation vector; and
projecting the point cloud to the image coordinate system based on the calibration data.

3. The method of claim 1, wherein the image pixel labels are obtained from a pre-trained image segmentation network.

4. The method of claim 1, further comprising:
filtering out overlapping images indicating a driving distance less than a particular distance value.

5. The method of claim 1, wherein projecting the point cloud comprises:
projecting the point cloud by a pinhole camera model.

6. The method of claim 1, further comprising:
removing, from the point cloud, points that have different labels between the points and the corresponding image pixels.

7. The method of claim 1, further comprising:
removing, from the point cloud, points representing dynamic objects including one or more of: pedestrians, bicycles, or vehicles.

8. The method of claim 1, wherein projecting the point cloud further comprises:
assigning, a point color of a point in the point cloud, with a pixel color from the nearest image pixel when the point has at least two different image pixels.

9. The method of claim 1, further comprising:
enhancing a road marker color by adding an intensity value to each point in the point cloud.

10. The method of claim 1, further comprising:
updating the pose graph with the six-dimensional colored point cloud.

11. The method of claim 1, wherein transforming the six-dimensional colored point cloud into the five-dimensional map tiles comprises:
removing, from the six-dimensional colored point cloud, points corresponding to an object having a height larger than a particular height value; and
transforming the six-dimensional colored point cloud into the five-dimensional map tiles by ignoring Z coordinate values.

12. A system comprising:
at least one processor; and
a memory storing instructions thereon that, when executed by the at least one processor, cause the at least one processor to perform operations, comprising:
receiving a point cloud from a pose graph;
receiving an image from a driving log of a vehicle, the image corresponding to the point cloud from the pose graph;
obtaining image pixel labels for the image;
interpolating, with the at least one processor, a pose of the image according to poses of two neighboring images, wherein the two neighboring images correspond to two point clouds, wherein the two point clouds include a first point cloud having a time stamp immediately earlier than a time stamp of the image and a second point cloud having a time stamp immediately later than the time stamp of the image;
projecting the point cloud in a point cloud coordinate system to an image coordinate system based on the image pixel labels;
generating a six-dimensional colored point cloud by combining the point cloud and color information from the image; and
transforming the six-dimensional colored point cloud into five-dimensional map tiles to form a colored map layer.

13. The system of claim 12, the operations further comprising:
receiving calibration data from the driving log of the vehicle, wherein the calibration data includes transformation matrices including an intrinsic matrix for a camera, a rotation matrix and a translation vector; and
projecting the point cloud to the image coordinate system based on the calibration data.

14. The system of claim 12, further comprising:
removing, from the point cloud, points that have different labels between the points and the corresponding image pixels.

15. The system of claim 12, further comprising:
removing, from the point cloud, points representing dynamic objects including one or more of: pedestrians, bicycles, or vehicles.

16. The system of claim 12, wherein projecting the point cloud further comprises:
assigning, a point color of a point in the point cloud, with a pixel color from the nearest image pixel when the point has at least two different image pixels.

17. The system of claim 12, wherein transforming the six-dimensional colored point cloud into the five-dimensional map tiles comprises:
removing, from the six-dimensional colored point cloud, points corresponding to an object having a height larger than a particular height value; and
transforming the six-dimensional colored point cloud into the five-dimensional map tiles by ignoring Z coordinate values.

18. A non-transitory, computer-readable storage medium having instructions stored thereon, that when executed by at least one processor, cause the at least one processor to perform operations, comprising:
receiving a point cloud from a pose graph;
receiving an image from a driving log of a vehicle, the image corresponding to the point cloud from the pose graph;
obtaining image pixel labels for the image;
interpolating, with the at least one processor, a pose of the image according to poses of two neighboring images, wherein the two neighboring images correspond to two point clouds, wherein the two point clouds include a first point cloud having a time stamp immediately earlier than a time stamp of the image and a second point cloud having a time stamp immediately later than the time stamp of the image;
projecting the point cloud in a point cloud coordinate system to an image coordinate system based on the image pixel labels;
generating a six-dimensional colored point cloud by combining the point cloud and color information from the image; and transforming the six-dimensional colored point cloud into five-dimensional map tiles to form a colored map layer.

* * * * *

UNITED STATES PATENT AND TRADEMARK OFFICE
CERTIFICATE OF CORRECTION

| | |
|---|---|
| PATENT NO. | : 12,165,256 B2 |
| APPLICATION NO. | : 17/991794 |
| DATED | : December 10, 2024 |
| INVENTOR(S) | : Xiaogang Wang, Venice Erin Baylon Liong and Zhiyong Weng |

It is certified that error appears in the above-identified patent and that said Letters Patent is hereby corrected as shown below:

On the Title Page

Item (72) (Inventors), Lines 3-4, Delete "Boston, MA (US)" and insert -- Singapore (SG) --.

Signed and Sealed this
Fourth Day of February, 2025

Coke Morgan Stewart
*Acting Director of the United States Patent and Trademark Office*